United States Patent [19]

Acampora

[11] Patent Number: 4,495,619

[45] Date of Patent: Jan. 22, 1985

[54] TRANSMITTER AND RECEIVERS USING RESOURCE SHARING AND CODING FOR INCREASED CAPACITY

[75] Inventor: Anthony Acampora, Freehold, N.J.

[73] Assignee: AT&T Bell Laboratories, Murray Hill, N.J.

[21] Appl. No.: 579,521

[22] Filed: Feb. 13, 1984

Related U.S. Application Data

[63] Continuation of Ser. No. 314,352, Oct., 1981, abandoned.

[51] Int. Cl.³ .............................................. H04B 1/10
[52] U.S. Cl. ...................................... 370/104; 375/58
[58] Field of Search ..................... 375/39, 57, 58, 60, 375/99; 370/104, 105, 106, 107; 371/41, 49, 50; 370/104, 105, 106, 107; 455/50, 53; 328/165

[56] References Cited

U.S. PATENT DOCUMENTS

| | | | |
|---|---|---|---|
| Re. 28,577 | 10/1975 | Schmidt | 370/104 |
| 3,487,362 | 12/1969 | Frey | 375/58 |
| 3,505,479 | 4/1970 | Hodge | 370/17 |
| 3,524,136 | 8/1970 | Albersheim | 375/58 |
| 3,534,264 | 10/1970 | Blasbalg et al. | 375/58 |
| 3,632,885 | 1/1972 | Herold | 370/104 |
| 3,634,628 | 1/1972 | Sekimoto et al. | 370/8 |
| 3,649,764 | 3/1972 | Maillet | 370/104 |
| 3,676,778 | 7/1972 | Mori | 455/13 |
| 3,688,196 | 8/1972 | Doelz | 375/39 |
| 3,848,093 | 11/1974 | Edstrom | 370/104 |
| 3,980,945 | 9/1976 | Bickford | 375/58 |
| 4,309,771 | 1/1982 | Wilkens | 375/58 |

OTHER PUBLICATIONS

Datamation, Jul., 1978, "The Future of Commercial Satellite Telecommunications", by W. White et al., pp. 94-102.

AIAA 7th Comm. Satellite Systems Conf., San Diego, Calif., Apr. 24-27, 1978, "Channel Coding . . . ", by A. Acampora, pp. 479-487.

Conf. Rec. of the 26th Convention of Nuclear Elec. and Aerospace, Rome, Italy, Mar. 9-18, 1979, "Technical Aspects . . . ", F. Carassa.

BSTJ, vol. 58, (9), Nov., 1979, "A Shared Resource TDMA Approach to Increase . . . ", by A. Acampora, pp. 2097-2111.

*Primary Examiner*—Robert L. Griffin
*Assistant Examiner*—Stephen Chin
*Attorney, Agent, or Firm*—Erwin W. Pfeifle

[57] ABSTRACT

The present invention relates to transmitters and receivers in a digital time division multiple access (TDMA) communication system wherein the resource sharing concept is generalized by fully exploiting the available clear air carrier-to-noise ratio (CNR) of a transmission link to achieve very high transmission capacity while maintaining low rain outage. Transmission is accomplished by using a first predetermined redundancy code and a first predetermined signal constellation for quadrature amplitude modulation during clear air conditions to permit a high rate of information transfer. When the fade depth exceeds the built-in fade margin, a second predetermined redundancy code and a second predetermined signal constellation is used while using time slots borrowed from a resource sharing reserved time slot pool to maintain the data rate at the fade site. Either one of the first redundancy code or signal constellation can equal either one of the second redundancy code or signal constellation.

7 Claims, 9 Drawing Figures

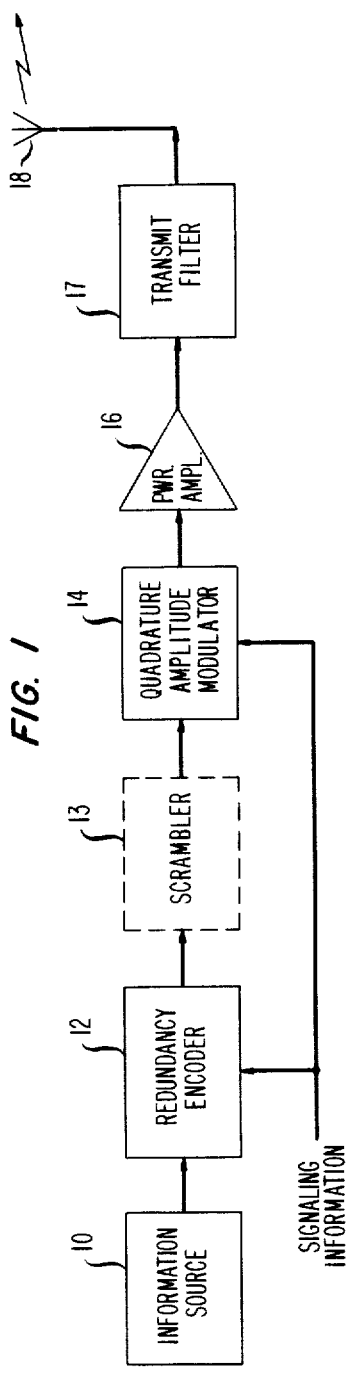
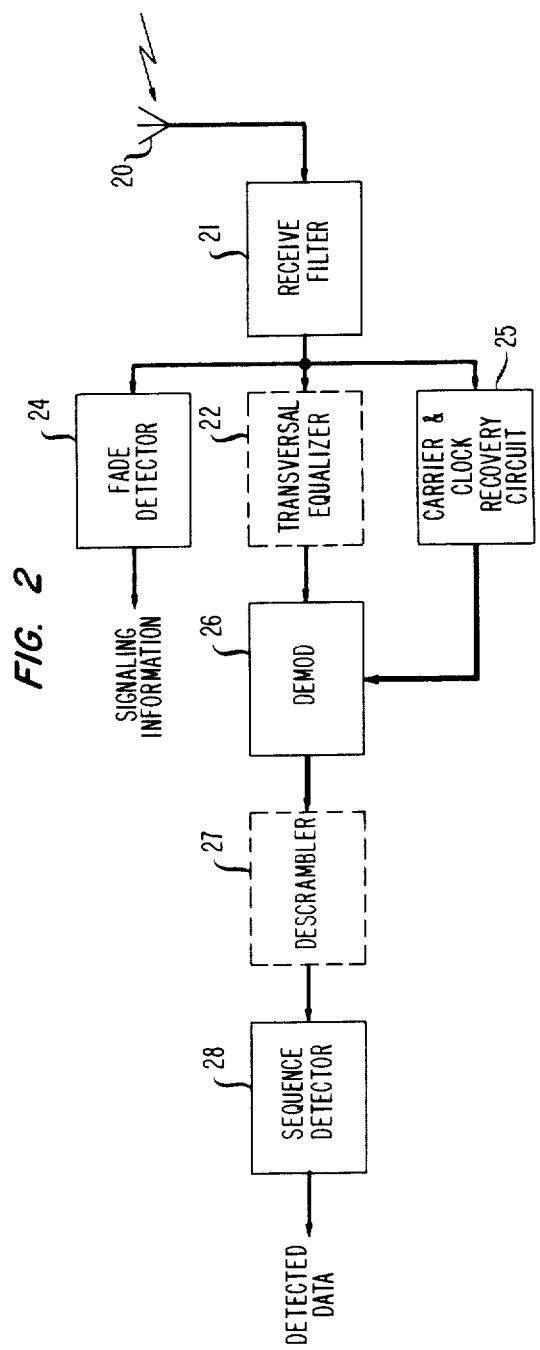

TRANSMITTER AND RECEIVERS USING RESOURCE SHARING AND CODING FOR INCREASED CAPACITY

CROSS-REFERENCE TO RELATED APPLICATION

This is a continuation of application, Ser. No. 314,352, filed Oct. 23, 1981, now abandoned.

BACKGROUND OF THE INVENTION

1. Field of the Invention

The present invention relates to transmitters and receivers which use resource sharing and coding to provide increased capacity and sufficient link margin and, more particularly, to transmitters and receivers for use in time division multiple access (TDMA) communication systems such as, for example, a digital satellite system wherein the resource sharing concept is generalized by fully exploiting the available clear-air carrier-to-noise ratio of the satellite link to achieve very high transmission capacity while maintaining low rain outage. During clear-air conditions, redundancy codes, as for example a convolutional code, and a large channel signaling alphabet are employed to permit a high rate of information transfer. When the fade depth exceeds the built-in fade margin, the signaling alphabet may be reduced and enough time slots, or portions of a time slot, are borrowed from a resource sharing reserved pool to maintain the data rate at the fade site.

2. Description of the Prior Art

The current trend in communication satellites appears to be increasingly toward the use of the 12/14 GHz and higher frequency bands and the use of digital modulation formats with Time Division Multiple Access (TDMA) techniques. The former provides freedom from existing 4/6 GHz terrestrial interference and also provides higher antenna gain and narrower beams for a given size aperture, while digital transmission in conjunction with TDMA provides for more efficient utilization of the available satellite system resources.

A major drawback associated with 12/14 GHz systems is the signal attenuation associated with rainfall. In general, attenuation at these frequencies is an increasing function of rain rate, with the result that, for example, over a large portion of the United States, significant power margin must be provided to prevent excessive outage due to rain fades.

A typical prior art technique for overcoming rain fades is disclosed in an article "The Future of Commercial Satellite Telecommunications" by W. White et al in Datamation, July 1978 at pp. 94–102 which discloses at pp. 98–99 that it may be possible to overcome rain attenuation in satellite systems by transmitting the same burst several times. The ground station in the momentary rain zone can add the multiple signals for the same burst together to reconstruct the original signal.

Other standard techniques which might be employed to provide rain margin include (1) increasing the radiated power of the satellite and earth stations, (2) improving the noise figure of the receivers, (3) installing larger ground station antennas, and (4) providing site diversity. Unfortunately, these techniques (1)–(4) are costly in that permanently dedicated system resources are used only infrequently, i.e., when it rains. Therefore, the system has been tremendously overdesigned for the clear air conditions which might exist more than 99.9 percent of the time at any particular ground location if, for example, 15 or 20 dB rain margin is required to achieve the desired rain outage.

Techniques for increasing the rain margin of a satellite communication system without the requirement of additional system resources are described in U.S. Pat. No. 4,309,764 issued Jan. 5, 1982 for A. Acampora and U.S. Pat. No. 4,301,533 issued Nov. 17, 1981 for A. Acampora et al, and assigned to the same assignee as the present invention. The invention of each of these patents uses regular uncoded symbol-by-symbol transmissions between ground stations via a satellite when no fade condition exists at either the transmitter or receiver, but spare concurrent TDMA time slots in each frame sequence are obtained from a pool or by rearrangement of spare time slot assignments for use in communications with ground stations experiencing rain attenuation events which exceed a predetermined power margin.

In U.S. Pat. No. 4,309,764 during rain attenuation events, additional power margin is provided by each transmitter using burst extension and coding techniques. Each transmitter, therefore, must include means which can be switched to provide the appropriate nonfade-uncoded or fade-encoded preamble and message information to enable transmission to (a) nonfaded receivers, (b) faded receivers or (c) transmission to a nonfaded receiver where the transmitter experiences a fade condition and increased power transmission is not available. At each receiver which can experience a fade or receive encoded information from a faded transmitter not capable of increasing transmission power, each receiver includes means which can be switched to receive and process unity or greater extended field frame synchronization signals, carrier and clock signals, start of message signals and other encoded preamble and data information destined for the receiver to overcome the fade condition.

In U.S. Pat. No. 4,301,533 arrangements are disclosed wherein additional down-link margin is provided to a station experiencing a rain fade condition by the use of concurrent pool or rearranged spare time slots associated with each down-link beam frame format to permit the power normally transmitted in multiple concurrent beams from the satellite to be applied in effectively one or more beams directed at the ground station or stations experiencing the fade condition.

The problem remaining in the prior art is to provide a technique which provides sufficient power margin in communications between two remote stations during either clear air or rain fade periods without the requirement of additional system resources and which maximize the data throughput and minimize outage time due to insufficient power margin.

SUMMARY OF THE INVENTION

The foregoing problems have been solved in accordance with the present invention which relates to transmitters and receivers which use resource sharing and coding to provide increased capacity and sufficient power margin and, more particularly, to transmitters and receivers for use in time division multiple access (TDMA) communication systems such as, for example, a digital satellite system wherein the resource sharing concept is generalized by fully exploiting the available clear-air carrier-to-noise ratio of the satellite link to achieve every high transmission capacity while maintaining low rain outage. During clear-air conditions, redundancy codes, as for example a convolutional code, and a large channel signaling alphabet are employed to permit a high rate of information transfer. When the fade depth exceeds the built-in fade margin, the signaling alphabet is reduced and enough time slots, or portions of a time slot, are borrowed from a resource sharing reserved pool to maintain the data rate at the fade site.

It is an aspect of the present invention to provide, in a time division multiple access (TDMA) communication system comprising a plurality of remote, spaced-apart, ground stations which communicate with one another using digital message bursts in assigned time slots of a frame sequence, a transmitter capable of launching one or more digital message bursts during a frame sequence destined for each appropriate other ground station of the system and a receiver capable of processing the received message bursts. The transmitter comprises encoding means capable of encoding each message burst signal into a redundancy encoded output signal comprising a first predetermined redundancy when the Carrier-to-Noise ratio (CNR) in the transmission between the transmitter and a remote ground station is above a predetermined threshold level corresponding to a predetermined clear air value, and a second selectively predetermined redundancy which is equal to or different than the first predetermined redundancy when the CNR is less than the predetermined threshold level corresponding to a fade condition existing in a transmission between the transmitter and a remote ground station; modulating means capable of converting each redundancy encoded output signal from the encoding means into a predetermined signaling constellation, as, for example, an M-ary phase shift keyed (PSK) signal where M is a first predetermined value when a first predetermined redundancy is used by the encoding means and a second predetermined value, which can be equal or different than the first predetermined value, when a second selectively predetermined redundancy is used by the encoding means; and amplifying means for amplifying each digital message burst signal to be transmitted to a predetermined level for transmission to the remote ground station.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 1 illustrates a block diagram of a typical transmitter in accordance with the present invention;

FIG. 2 illustrates a block diagram of a typical receiver in accordance with the present invention;

DETAILED DESCRIPTION

Figure 3:
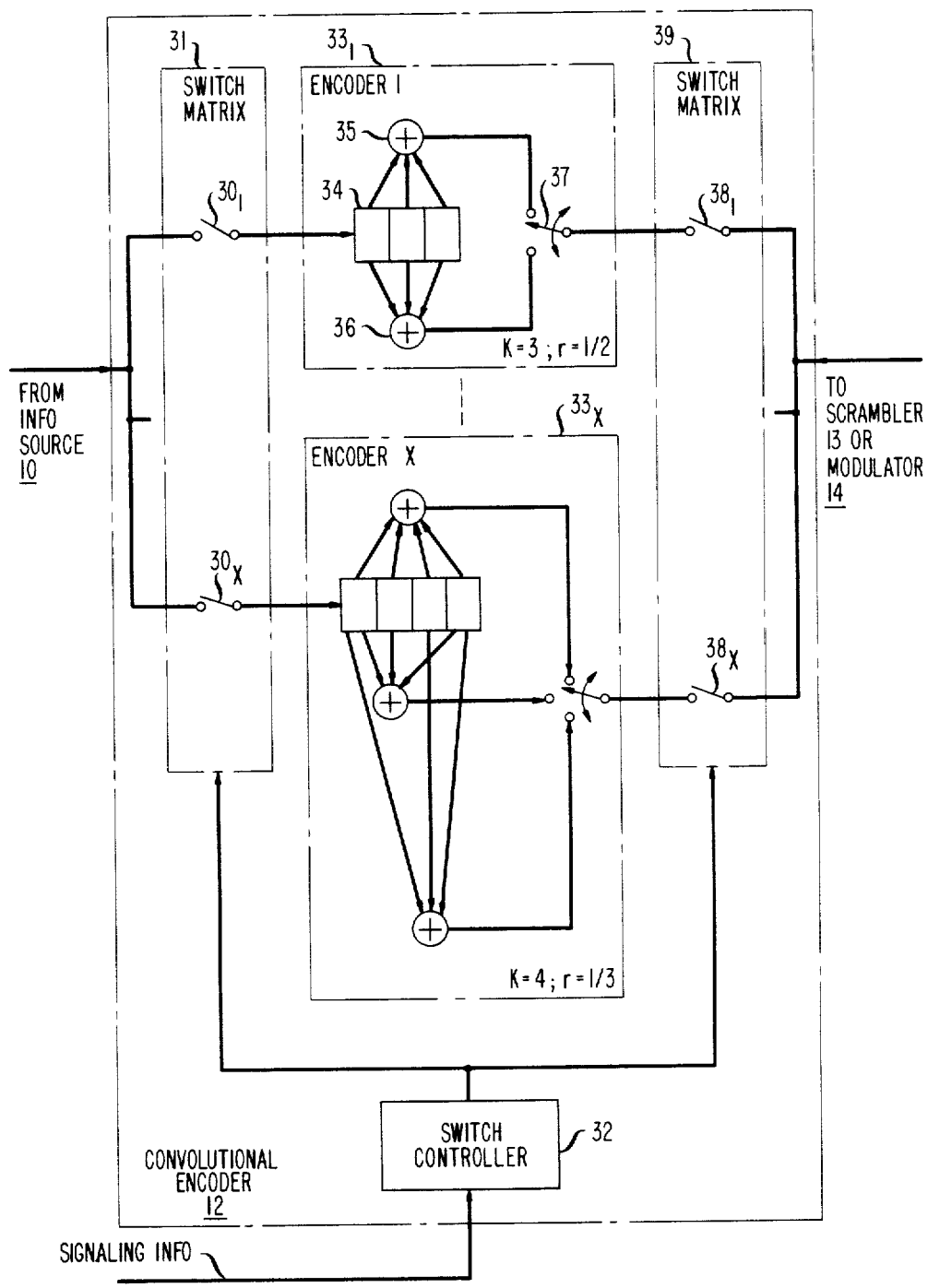
FIG. 3 is a block diagram of a typical convolutional encoder for use in the arrangement of FIG. 1.

The present invention is described hereinafter for use in a time division multiple access (TDMA) communication system. In such system, a TDMA switching frame format is used to permit communication between the various transmitters and receivers of the system. In such format, each frame period comprises a plurality of time slots which are allocated to provide normal two-way TDMA transmission channels between the various transmitters and receivers. Typical allocation of time slots in single or multiple beam frame formats are well known in the art which prevent concurrent transmissions to any one of the receivers. Typically, each time slot includes a message burst comprising preamble information, data or message information and possibly some post-amble information which is transmitted by one transmitter to a destinational remote receiver. Preferably, the present invention is used in a TDMA satellite communication system where the transmitter is located at one ground station and the receiver at another or the same ground station and communication therebetween is via a satellite as is well known in the art.

When used in a time division multiple access (TDMA) communication system, the resource sharing concept generally involves the creation of a small pool of time slots within each frame which are reserved for assignment upon demand to those ground stations experiencing instantaneous fade depths greater than the built-in margin. Error correcting codes are used to fill these extra time slots, thereby maintaining the threshold bit error rate at these stations with less incident power than otherwise needed. Because of the infrequency of simultaneous deep fades at multiple sites, a small reserved pool can be shared among and protect a large number of ground stations. Resource sharing was originally intended to provide low rain outage at a fixed transmission rate while reducing the required satellite power. This power reduction is important in both power-limited situations and also when the higher effective isotropic radiated power (e.i.r.p.) required to provide low outage would cause undue interference into other satellite systems designed with poorer outage objectives in mind.

As will be described hereinafter and in accordance with the present invention, the resource sharing concept is applied to also increase the rate at which information can be transferred by a satellite. To illustrate the concept of the present invention, suppose that a satellite High Power Amplifier (HPA) can generate P watts of r.f. power. If resource sharing is not used, then only a small fraction of this power is used to deliver information; the remainder constitutes the rain margin. With resource-sharing, however, much less rain margin is needed to maintain link availability. Thus, a much larger fraction of power P is available to deliver information. Hence, it becomes possible to use a larger signaling alphabet to increase the clear-air capacity, thereby consuming the excess clear-air carrier-to-noise ratio (CNR) formerly needed to provide low outage with a smaller throughput. Channel coding is used to maximize the deliverable capacity. During fade events, a smaller signaling alphabet, together with borrowed time slots and coding, is used to maintain link availability. Since the CNR is reduced during a fade, the rate at which information can be transferred is lowered, implying that it takes longer to transmit a fixed amount of information and that the burst length must therefore increase. During both operating modes, nonreal time decoding between burst arrivals is used. This approach exploits the low duty cycle of each TDMA user and renders a practical implementation. The channel symbol rate, in bauds, can either remain fixed for both modes, or can be varied to improve performance still further.

In accordance with the present invention, an optimum amount of built-in margin is to be provided to furnish maximum data throughput. To illustrate the reason for such provision, suppose the clear-air CNR at a receiving ground station is $p_{max}$. At this maximum available CNR, it is possible to transmit information at a rate $R_{max}$. However, not all of the clear-air CNR is available to transmit information since some modest level of fade margin must be provided to avoid continuous use of the reserved pool. Thus, the received CNR at the threshold where resource sharing becomes necessary is $p < p_{max}$, corresponding to a clear-air transmsision rate $R < R_{max}$. Let the fraction of the TDMA frame reserved for resource-sharing be F. Then, the rate of information transfer or usable capacity is $(1-F)R$. Now, if the built-in fade margin is too great, then R is smaller than need be and the usable capacity suffers. Alternatively, if too little built-in fade margin is provided, then the fraction of the frame which must be reserved to provide multiple site fade protection is too large, and the usable capacity again suffers. Hence, there is an optimal margin, i.e., one for which $(1-F)R$ is maximized, which is provided by the present invention.

FIG. 1 illustrates a typical transmitter arrangement for practicing the present invention. There, an information source 10 generates independent binary digits at a rate of Q bits/sec., which are transmitted to an encoder 12. Encoder 12 functions to encode the input binary signal from information source 10 into either a first redundancy encoded output signal when a non-fade condition corresponding to a predetermined clear air carrier-to-noise ratio (CNR) exists between the transmitter and a remote receiver, or a second redundancy encoded output signal when a fade condition below a predetermined power margin exists between the transmitter and remote receiver where the second redundancy is equal to or different than the first redundancy. It is to be understood that in accordance with the present invention, the second redundancy encoded output signal can comprise either a single redundancy for all fade conditions or, more preferably, different redundancies which are used for different predetermined depths of fade between the transmitter and remote receiver to maintain a maximum possible throughput of information on a channel.

A typical encoder which can be used for encoder 12 of FIG. 1 is the convolutional encoder. Convolutional encoders for encoding a binary bit stream into a redundancy encoded output signal are well known in the art as described, for example, in the article "A Shared Resource TDMA Approach To Increase The Rain Margins of 12/14 GHz Satellite Systems" by A. Acampora in BSTJ, Vol. 58, No. 9, November 1979 at pp. 2097-2111. A typical arrangement for convolutional encoder for use in encoder 12 is illustrated in present FIG. 3 which combines various arrangements of the type of convolutional encoders shown in the Acampora article to provide the functions of encoder 12 described hereinbefore. It is to be understood that the arrangement of convolutional encoder 12 provided in FIG. 3 is for exemplary purposes only and not for purposes of limitation since a single redundant code would always be used or other redundant codes or suitable arrangements could be used for that shown in FIG. 3. Additionally, it is to be understood that other redundancy encoders could be used instead of a convolutional encoder.

In the exemplary arrangement of FIG. 3, the digital signal from information source 10 is provided as an input to each of a plurality of X switching means $30_1-30_X$ forming a first switching matrix 31. Switching means $30_1-30_X$ are responsive to switching control signals from a switch controller 32 to selectively close, at any instant of time, a desired one of the switching means $30_i$ to permit the input digital signal to be transmitted through the selected switching means to an associated separate one of a plurality of X encoders $33_1-33_X$. Switch controller 32 functions to close the proper switching means $30_i$ during each time slot of a frame sequence as dependent upon the predetermined fade or non-fade condition existing in the transmission of a message burst between a transmitter and a receiver assigned to each time slot in order to direct the input signal to the proper predetermined redundancy encoder.

Figure 4:
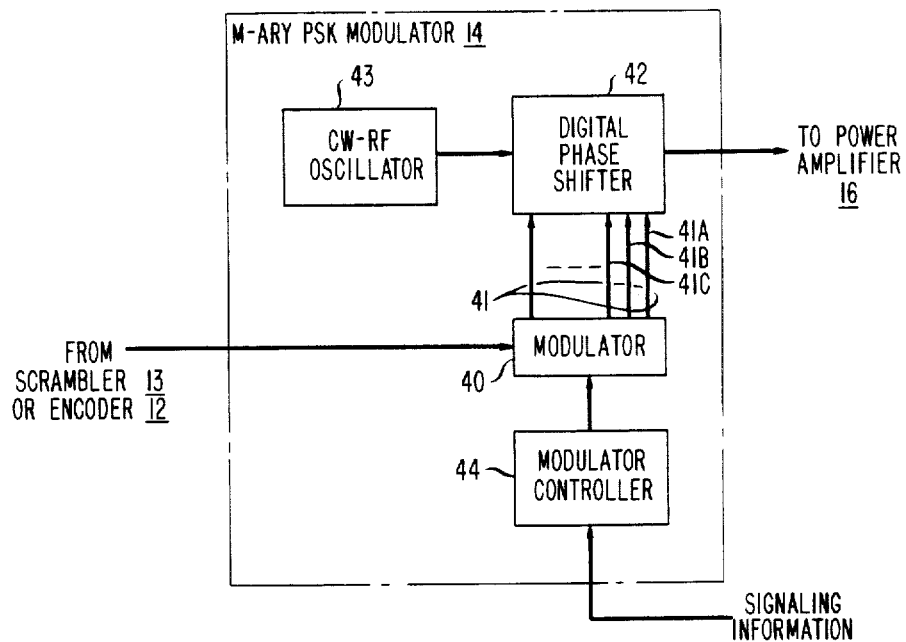
FIG. 4 is a block diagram of a typical M-ary PSK modulator for use in the Quadrature Amplitude Modulator of FIG. 1.

Switch controller 32 can comprise any suitable circuit for providing the above-described function as, for example, an arrangement similar to that shown in FIG. 4 of U.S. Pat. No. 3,789,142 issued to N. Shimasaki et al on Jan. 29, 1974. More particularly, switch controller 32 can comprise a plurality of sequential memory locations in a random access memory (RAM) which are associated on a corresponding one-to-one basis with the plurality of sequential time slots of a frame sequence. Stored in each memory location is the appropriate command for closing the proper switching means $30_i$ during the associated time slot period of each frame sequence. Then, by synchronizing the sequential accessing of the memory locations in the RAM with the time slot sequence of the frame period, each of the TDMA message bursts will be directed to the proper redundancy encoder $33_i$ to provide maximum data throughput for fade or non-fade conditions that exist as will be described in greater detail hereinafter. As the fade or non-fade condition between a transmitter and a receiver changes, the memory location in the RAM associated with the time slot assigned for transmission between the transmitter and the receiver will be rewritten by signaling information, from the receiver or via a master station, reflecting such changes to provide the updated and proper switching means closure command.

In FIG. 3, then, the closure of switching means $30_1$ directs the input signal to an encoder $33_1$ while the closure of switching means $30_X$ directs the input signal to an encoder $33_X$. The arrangement shown for encoder $33_1$ provides a constraint length $K=3$, $r=\frac{1}{2}$ code and the arrangement for encoder $33_X$ provides a constraint length K=4, r=½ code, which arrangements are well known in the art and are for exemplary purposes only since any other known arrangement could be used for providing the necessary encoding and maximum data throughput under fade and non-fade conditions. In encoder $33_1$, digital data at the input is serially shifted through a three-bit shift register 34. Between shifts, modulo-2 adders 35 and 36 operate on all the stored bits and the first and third bits, respectively, to produce separate output signals. A commutator 37 first selects the output from adder 35 and then selects the output from adder 36 for transmission to the input of a second switching means $38_1$ which is a part of a plurality of X second switching means $38_1$–$38_X$ forming a second switching matrix 39. Encoder $33_X$ operates in a similar manner on digital data which is gated through first switching means $30_X$ using an appropriate length shift register and three modulo-2 adders to provide the K=4, r=½ code.

Switch controller 32 also functions to close, concurrent with the closure of the selected first switching means $30_i$, the corresponding one of the second switching means $38_i$ so that data selectively switched to a particular encoder $33_i$ has the resultant encoded output signal delivered to the output of convolutional encoder 12 for transmission to a Quadrature Amplitude Modulator 14 via an optional scrambler 13. In operation, for example, a message burst will be directed by switching matrices 31 and 39 to and from encoder $33_1$ when a clear-air CNR condition exists between a transmitter and receiver associated with a particular time slot. However, when, for example, a fade condition below a predetermined rain margin exists between a transmitter and receiver, then switching matrices 31 and 39 may direct a message burst through encoder $33_X$ during the more than one time slot associated with such transmitter to receiver communication. It is to be understood that only the essential circuitry of convolutional encoder 12 has been described to provide a basic understanding of the present invention. More particularly, the arrangement of convolutional encoder 12 more realistically would be similar to the arrangement of the burst modem shown in FIG. 3 of U.S. Pat. No. 4,309,764 issued on Jan. 5, 1982 for the present inventor as described hereinbefore, except that the arrangement of present FIG. 3 would be substituted for the encoder 24 and switching arrangement 25 in the prior patent's FIG. 3. In that manner, each message burst would be properly formatted and transmitted in the appropriate one or more time slots of a frame sequence using the combined coding and resource sharing technique in accordance with the present invention.

The output signal from encoder 12 is used as an input signal to either an optional scrambler 13 of any known type which insures independence of contiguous encoded symbols or a Quadrature Amplitude Modulator (QAM) 14, which functions to convert a predetermined number of bits of a digital signal into a corresponding phase and amplitude modulated signal, as is well known in the art. A specific type type of QAM is the M-ary Phase Shift Keyed (PSK) modulator which converts a group of bits of a digital signal into a predetermined fixed amplitude and variable phase output signal. For descriptive purposes only, an exemplary M-ary PSK modulator 14 for use in QAM 14 of FIG. 1 is shown in FIG. 4.

In the M-ary PSK modulator 14 of FIG. 4, the redundancy encoded and possibly scrambled digital signal from encoder 12 is received by a modulator 40. Modulator 40 functions to convert a predetermined number of consecutive bits of the input digitally encoded and possibly scrambled signal into control signals which are transmitted over leads 41 to a digital phase shifter 42 to provide a proper PSK signal, representative of the configuration of the consecutive bits, as an output of modulator 14. More particularly, a continuous wave, radio frequency (CW-RF) signal is generated by an oscillator 43 which is shifted in phase by digital phase shifter 42 to one-of-M phase shifts in accordance with the control signals from modulator 40. Such PSK signal is a representation of the predetermined number of consecutive bits of the input signal from encoder 12 to modulator 14. For example, if M=8, then a pulse on a first lead $41_a$ from modulator 40 is used to indicate a possible phase shift of 180 degrees, a pulse on a second lead $41_b$ from modulator 40 is used to indicate a possible phase shift of 90 degrees and a pulse on a third lead $41_c$ from modulator 40 is used to indicate a possible phase shift of 45 degrees with all other leads being unused. Therefore, selective concurrent pulses on predetermined ones of leads $41_a$–$41_c$ provides the one-of-8 phase shift needed to encode the predetermined number of consecutive bits from encoder 12.

In accordance with the present invention, however, for a predetermined clear-air CNR it may be desired to use a predetermined value of M while, for example, for various other CNR ranges, representing various separate levels of fading in transmissions between a transmitter and receiver, it may be desired to use different separate values of M, which are greater than the clear-air value of M, to provide maximum data throughput. For example, for a clear-air CNR condition, M can be chosen to equal the value 32 while for a deep fade condition M may be chosen to equal 4. To achieve a separate predetermined selectable value for M for each of the clear-air CNR and the various other CNR fade condition ranges, modulator 40 is made responsive to control signals from a modulator controller 44 which instructs modulator 40 of the value of M to be used during each time slot of a frame period as determined from the transmission conditions that exist between the transmitter and receiver assigned to each time slot. Modulator controller 44 can comprise an arrangement similar to that described for switch controller 32 of convolutional encoder 12 of FIG. 3, such as a RAM with sequential memory locations which are read in sequence and in synchronism with the time slots of the frame sequence with which they are directly related. Updating of the information regarding the value of M to be used for each time slot as conditions change can be accomplished via signaling information received by modulator controller 44 directly from each receiver or via a master station. It is to be understood that each of the controllers 32 or 44 could also be implemented by any other suitable arrangement such as a microprocessor which functions to provide the necessary switching or M-value control signals. Such control signals, however, merely reflect the clear-air CNR or depth of fade CNR value that exists in any transmission during each time slot period which is correlated into the proper control of the switching matrices or modulator to provide maximum data throughput for a predetermined bit error rate (BER) as will be described in greater detail hereinafter.

The output signal from quadrature amplitude modulator 14 is amplified in a power amplifier 16 and filtered in a transmit filter 17, which can comprise, for example, a p-pole Butterworth filter as will be assumed hereinafter, before being radiated by an antenna 18 to a remote receiver.

A typical receiver in accordance with the present invention is shown in FIG. 2. The convolutional encoded and possibly scrambled, quadrature amplitude modulated signal transmitted by the transmitter of FIG. 1 is received at the antenna 20 of the receiver. The received signal is transmitted to a receive filter 21, which preferably is matched to the waveshape of an isolated received pulse, and then to an optional transversal equalizer 22 for eliminating intersymbol interference. The output of filter 21 can also be directed to a fade detector 24 which detects the signal-to-interference (S/I) or carrier-to-noise-ratio (CNR) and transmits such indication in appropriate form back to the transmitters or to a master station which then interprets the signal and informs all transmitters of any significant change from a prior detected value which is being used by the transmitters for a corresponding time slot transmission to the receiver. More particularly, the fade detector 24 output signal can be transmitted in a separate channel or with the preamble or post-amble information of a message burst, and the transmitter or master station need merely determine in which band corresponding to a clear-air or fade condition the S/I or CNR information value lies in order to correlate it directly with a predetermined redundancy code and M-ary PSK level of modulation to be used to obtain maximum data throughput. The output of receive filter 21 is also directed to a Carrier and Clock Recovery circuit 25 to permit the recovery of the carrier and clock timing signals from the receiver signals as is well known in the art. A typical circuit is disclosed in the article "Burst Modem Synchronization at Low CNR Levels" by A. Acampora et al in NTC-80, Houston, Tex., Nov. 30–Dec. 4, 1980, Vol. 2 at pp. 38.2.1–38.2.6.

Figure 5:
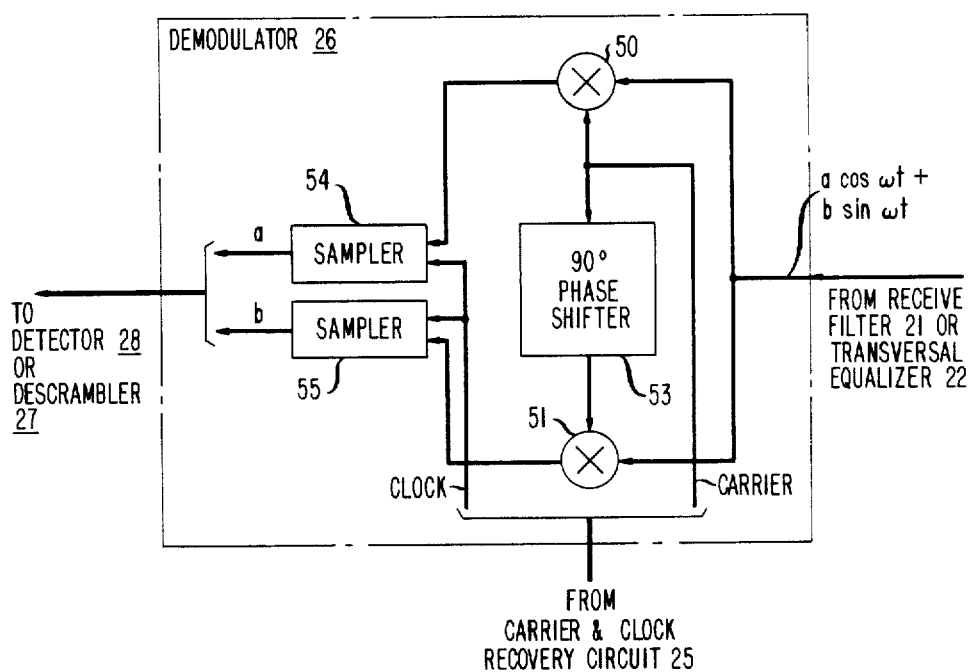
FIG. 5 is a block diagram of a typical demodulator for use in the receiver of FIG. 2.

The output signal from the front end of the receiver is transmitted to a demodulator 26 which functions to translate the input radio-frequency (RF) signal into an output signal indicative of the vector value of the original QAM signal produced by the remote transmitter. Demodulator 26 can comprise any well known arrangement as, for example, the arrangement of FIG. 5. In FIG. 5, the input RF signal, which is represented by the expression a cos ωt + b sin ωt, is divided in half with each half being delivered to a separate first and second mixer 50 and 51. In the first mixer 50, the signal from carrier recovery circuit 25 is mixed with the input RF signal to produce an output signal which, when sampled in sampler 54, is representative of the value a of the input signal. In the second mixer 51, the input RF signal is mixed with the output signal from the carrier recovery circuit 25 which has been phase shifted by 90 degrees in phase shifter 53 to generate an output signal which, when sampled in sampler 55, is representative of the value b of the input signal. The output signals from mixers 50 and 51 are then transmitted to an optional Descrambler 27 which is used when the original transmitted signal was scrambled in a scrambler 13 or when descrambling is not required then directly to a sequence detector 28. Descrambler 27 need merely function to reverse the scrambling process of scrambler 13.

Sequence Detector 28 functions to maximum-likelihood decode the redundancy encoded input signal used by encoder 12 at the remote transmitter. Sequence Detector 28 can comprise, for example, any suitable Viterbi decoding arrangement which functions in accordance with Equation (9) of the paper "Channel Coding for Digital Communication Satellites" by A. Acampora in AIAA 7TH Communications Satellite Systems Conference, San Diego, Calif., on Apr. 24–27, 1978, at pp. 479–487. In this regard see, for example, U.S. Pat. Nos. 3,789,360 issued to G. C. Clark, Jr. et al on Jan. 29, 1974 and 4,087,987 issued to A. Acampora on May 2, 1978. More particularly, in sequence detector 28 with the use of the Viterbi algorithm, data is not decoded as soon as it is received. Instead, a sequence of data, having a predetermined decoding depth, following the digit to be decoded is first collected. Then, by computing what are known as path metrics, a limited number of possible messages are selected, each extending throughout the decoding depth far beyond the digit presently to be decoded, with one such survivor sequence ending in each of the data states. A correlation between each survivor sequence and the data actually received is computed for the entire decoding depth under consideration. The highest correlated of the survivor sequences is then selected to be the sole survivor sequence. The earliest received digit or digits within the decoding depth is then permanently decoded under the temporary assumption that the sole survivor sequence is the correct sequence. The demodulated and decoded message burst is then transmitted to the proper information destination with which it is associated.

In the following description for finding the permissible information transmission rate vs. the received CNR for providing maximum data throughput in the arrangements of FIGS. 1 and 2, an M-ary modulator will be implied as used and the out-of-band power loss caused by the transmit filter 17 and the noise enhancement of the transversal equalizer 22 will be accounted for. For a clearer understanding, consider the transmission of non-overlapping rectangular pulses at the rate of one pulse every T seconds. The phase of each pulse is drawn from an M-ary alphabet, with signal points uniformly distributed along a circle. Let the received energy in one such pulse be denoted by $E_s$, that is, in the absence of a transmit filter 17, the energy received in each rectangular pulse is $E_s$. Then, it can readily be shown that an arbitrarily low bit error rate (BER) can be achieved by increasing the constraint length of the encoder 12, provided that the rate of information transfer per channel pulse is less than the parameter R as defined by the relationship $$R = -\log_2\left[\sum_{l=0}^{M-1} \frac{1}{M} \exp\left(-\frac{E_s}{N_o} \sin^2\left(\frac{l\pi}{M}\right)\right)\right]. \quad (1)$$

where $N_o$ corresponds to the white Gaussian noise of the two-sided spectral height $N_o/2$ which is introduced in the channel during transmission. A plot of R vs. $E_s/N_o$ is shown in FIG. 6 for various values of M.

Figure 6:
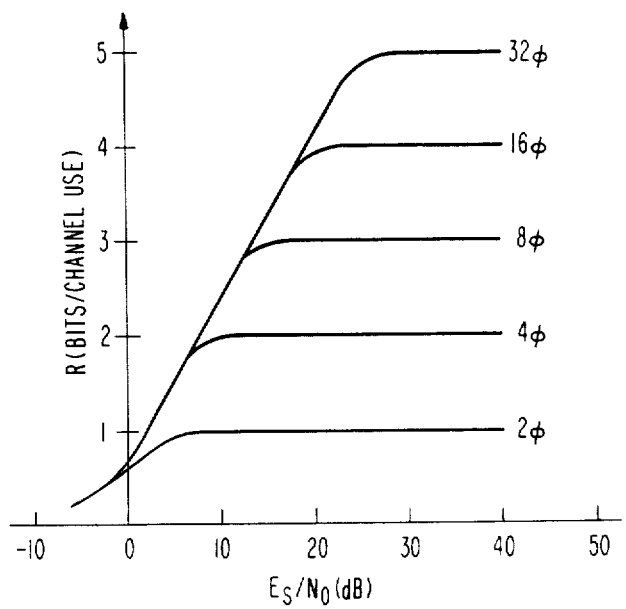
FIG. 6 illustrates curves of the computational cutoff rates for various M values of PSK modulation.

The curves of FIG. 6 can be applied to any Gaussian channel with PSK modulation, provided that (1) intersymbol interference is absent, (2) the noise samples at the input to the maximum-likelihood detector are independent, and (3) $E_s/N_o$ are replaced by the signal-to-noise ratio (SNR) of the peak signal samples. For the arrangement of FIGS. 1 and 2, conditions (1) and (2) apply when a zero-forcing transversal equalizer 22 is present and bit scrambling is employed. Thus, it remains to relate the SNR of the samples to that actually produced by the combination of transmit filtering, receiver matched filtering, and transversal equalization.

In this regard let B be the two-sided 3 dB bandwidth (B) of the receiver matched filter 21, and suppose that the power incident upon the receiver is P when the satellite radiates a continuous wave (c.w.) tone. Then, the received CNR can be defined as $$p = (P/N_o B). \quad (2)$$

If no transmit filter 17 is used, then the received energy per symbol is simple $E_s = PT$, where $1/T$ is the symbol signaling rate. Thus, $$(E_s/N_o) = pBT. \quad (3)$$

Accounting for the transmit filtering, the symbol energy actually received is given by $$e_s = E_s \int |P(\omega)H(\omega)|^2 \frac{d\omega}{2\pi} = \alpha E_s, \quad (4)$$

where $P(\omega)$ is the Fourier transform of a rectangular pulse of duration T, normalized to unity energy, and $H(\omega)$ is the transfer function of the transmit filter 17. The integration of Eq. (4) is readily computed via residues to yield the parameter $\alpha$, which varies with the BT product.

In the absence of a transversal equalizer 22, the SNR of the peak sample of an isolated pulse is given by $$\frac{e_s}{N_o} = \alpha(BT) \frac{E_s}{N_o} = pBT\alpha(BT). \quad (5)$$

The zero-forcing optional transversal equalizer 22 eliminates intersymbol interference, and thereby improves the BER performance, but does so at the expense of reducing the SNR of the samples to its final value $$\left(\frac{E_s}{N_o}\right) = \frac{e_s}{N_o \beta(BT)} = \frac{pBT\alpha(BT)}{\beta(BT)} \quad (6)$$

where the noise enhancement factor, $\beta$, is given by $$\beta = \frac{1}{2\omega_o \alpha} \int_{-\omega_o}^{\omega_o} \frac{d\omega/2\pi}{\sum_{k=-\infty}^{\infty} |P(\omega - 2k\omega_o)H(\omega - 2k\omega_o)|^2} \quad (7)$$

and $\omega_o = \pi/T$.

Using Eq. (6) and FIG. 6, the plots appearing in FIG. 7 can be obtained. These curves show the permissible information rate for which reliable communication is possible for the arrangement of FIGS. 1 and 2 vs. the received CNR, p, and are drawn for various BT products. The information rate is expressed in units of bits/sec/Hz by dividing the bits/channel pulse, R, by the BT product. Using the curves of FIG. 7, the throughput or capacity possible via resource-sharing in a rain fade environment will now be found.

The effects of rain are usually reported by means of an attenuation plot which show the fraction of time, on a yearly averaged basis, that the attenuation exceeds the abscissa. Such curves can be based upon S. H. Lin's model, for example, as described in the article "Empirical Rain Attenuation Model for Earth-Satellite Paths" in *IEEE Transactions on Communications,* Vol. COM-27, No. 5, May 1979, for converting long-term rain-rate data (obtainable from the U.S. Weather Bureau) into attenuation predictions. Factors affecting the rain attenuation curves are geographical location, carrier frequency, and satellite longitude.

Rain attenuation affects the received CNR in two ways. First, there is the obvious loss of received power. Second, the occurrence of rain increases the received sky noise. Suppose the rain attenuation reduces the received power to a level equal to $1/\psi$ times the clear-air value. Then, the total noise power spectral density is given by:

$$N'_o = N_o \left[ 1 + \left(\frac{\psi - 1}{\psi}\right) \left(\frac{T_s}{T_R}\right) \right] \quad (8)$$

where $N_o$ is the noise spectral density of the receiver front end, $T_R$ is the noise temperature of the receiver and $T_s$ is the temperature of the rain. Throughout, a rain temperature of 300 degrees K. will be assumed.

Let the clear air ($\psi = 1$) CNR be $p_{max}$. Then, from Eq. (8), the CNR corresponding to an attenuation of $1/\psi$ is given by $$p = \frac{1}{\psi} \left(\frac{N_o}{N'_o}\right) p_{max} = \frac{1}{\psi + (\psi - 1)(T_s/T_R)} p_{max}. \quad (9)$$

Figure 8:
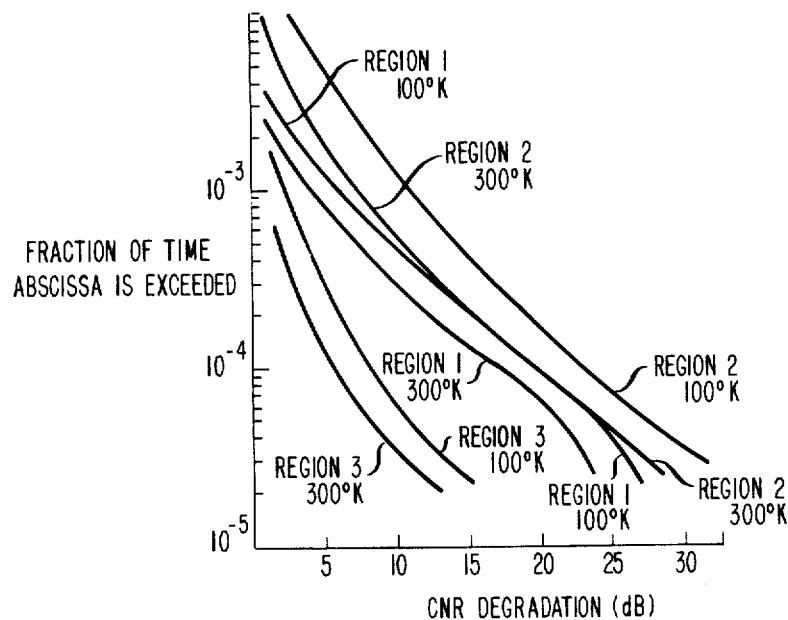
FIG. 8 illustrates curves for typical rain-induced carrier-to-noise degradation found at 12 GHz for a satellite located at 100 degrees W longitude and receiver temperature of 100 degrees K. and 300 degrees K. for three different site locations on the terrestrial surfaces.

Combining Eq. (9) with attenuation plots described hereinbefore for, for example, three locations using 12 GHz frequency band and 100 degrees W longitude of a satellite on the Geosynchronous Equatorial Arc, can provide curves such as shown in FIG. 8. Plotted there is the fraction of time, averaged over one year, that the CNR degradation from clear-air exceeds the abscissa. These curves imply that the use of cooled receivers tends to aggravate the effects of rain. However, the use of resource-sharing in such an aggravated situation can exploit the larger clear-air CNR afforded by cooled receivers to increase the overall capacity, as will be shown later.

To determine the ability of resource-sharing to overcome rain fading, it is necessary that both joint rain attenuation statistics among the various ground stations and the traffic distribution among ground stations be known. In the article "The Rain Margin Improvement Using Resource-Sharing in 12 GHz Satellite Downlinks" by A. Acampora in BSTJ, Vol. 60, No. 2, February 1981, a model has been developed which accounts for seasonal, diurnal and geographical correlation among rain fade events. The model assigns all of the yearly averaged probability of rain attenuation to typical thunderstorm activity periods. Thus, if the thunderstorm activity period constitutes a fraction $1/\sigma$ of the year, then the probability of some given CNR degradation exceeding the value A is given by:

$$p(A/t) = \begin{cases} \sigma P(A), & \text{for } t \text{ within thunderstorm period} \\ 0, & \text{elsewhere} \end{cases} \quad (10)$$

where P(A) is the yearly averaged probability obtained from curves such as shown in FIG. 8. Furthermore, it is assumed that, within the thunderstorm activity period, rain attenuation events occur independently for ground stations separated by wide distances. For closely-spaced sites, an additional degree of correlation is assumed in that the probability of attenuation exceeding some value $A_1$, conditioned on attenuation greater than $A_2$ at some close site, is greater by the factor $\eta>1$ than the unconditioned probability.

When compared against available site diversity data, this model is conservatively pessimistic for the values $\sigma=12$, $\eta=2$. This would imply that the thunderstorms occur at random only over a period equal to 1/12 of the year (3 out of 12 months and 8 out of 24 hours per day), and that the probability of rain attenuation at some site is doubled if rain attenuation is occurring at a neighboring site.

For the results to follow, it will be pessimistically assumed that all sites are located sufficiently close that the distance correlation factor $\eta$ always applies. Furthermore, this factor will be lumped together with the seasonal-diurnal factor $\sigma$, in effect reducing the size of the thunderstorm activity period. Comparison with site diversity data confirms that use of an overall correlation factor $\zeta=\eta\sigma$ equal to 24 provides moderately conservative predictions, and that $\zeta=100$ provides strongly conservative predictions.

A traffic model based upon United States population will also be assumed wherein 60 percent of the traffic is in the Northeast (Region 1) where rain attenuation is moderate, 15 percent is in the South (Region 2) where rain attenuation is heavy, and 25 percent in the West (Region 3) where rain attenuation is slight, with the curves of FIG. 8 being representative thereof. It is further assumed that all ground stations carry the same traffic load.

In addition to the above factors, the capacity possible with resource-sharing is dependent upon the size of the resource-sharing reserved pool and the rain outage objective. Suppose that all ground stations are located in Region 1. The clear-air CNR is $p_{max}$, and the built-in fade margin is A, that is, a ground station can operate without using the resource-sharing reserved pool at a CNR as low as $p_{max}/A$. Then, the transmission rate to those ground stations not using the reserved pool is limited to $C(p_{max}/A)$, where $C(.)$ is obtained from FIG. 7 for some particular BT product chosen. The rain outage objective is $\gamma$ hours per year. From FIG. 8, it is determined that the CNR degradation corresponding to this objective is A', that is, the CNR is lower than $p_{max}/A'$ for $\gamma$ hours per year. Again using FIG. 7, it is determined that the capacity possible at this CNR is only $C(p_{max}/A')$. Thus, to provide the desired outage objective with a built-in margin of $A<A'$, it is necessary to borrow from the reserved pool.

Suppose that the reserved pool has been sized to accommodate a total number of simultaneous fades equal to fN, where N is the number of ground stations and $0<f<1$. Then, because all ground stations are competing for the limited reserved pool, blockage can occur. This implies that to achieve the desired outage objective $\gamma$, resource-sharing must be capable of maintaining link availability at some fade depth $A''>A'$, such that the combined outage due to fades exceeding A" and blockage is equal to $\gamma$. The depth A" is dependent upon the built-in margin A, the number of ground stations N, the fraction f, the outage objective, and the rain correlation parameter $\zeta$. At the fade depth A", the permissible rate in bits/sec/Hz is $C(p_{max}/A'')$. Thus, to transfer a constant amount of information to that ground station each frame, it is necessary to expand the burst duration by a factor g:

$$g = \frac{C(p_{max}/A)}{C(p_{max}/A'')} = g(A,f). \tag{11}$$

In arriving at Eq. (11), the overhead associated with the burst preamble, the preamble is used to synchronize the TDMA burst modem, is neglected. This assumption is consistent with burst durations much longer than the preamble.

The total size of the resource-sharing reserved pool is equal to $(g-1)fN\tau$, where $\tau$ is that part of the frame used by one ground station during the normal mode of operation, and the total frame duration is $N\tau[1+(g-1)f]$. The amount of information transmitted in each frame is equal to $N\tau C(p_{max}/A)$. Thus, the effective usable rate of information transfer for the resource-sharing concept is given by $$G = \frac{C(p_{max}/A)}{1 + (g-1)f} \tag{12}$$

It remains to maximize G with respect to the built-in fade margin A and the fraction f, remembering that g is a function of both A and f, which will be by obtaining results asymptotically correct for large N, i.e., N>50, as an exemplary technique.

To maximize G, let A and $A'>A$ be two levels of CNR degradation caused by rain. During the thunderstorm activity period, the probability that a particular ground station experiences a CNR degradation between A and A' is given by $$q = \zeta[P(A) - P(A')]. \tag{13}$$

Within the thunderstorm activity period, fades occur independently. Thus, the number of ground stations K with CNR degradation between A and A' is governed by the binomial distribution:

$$P(K = i) = \binom{N}{i} q^i(1-q)^{N-i}. \tag{14}$$

Let $\epsilon$ be the fractional number of ground stations with CNR degradation between A and A'. Then, $$E\{\epsilon\} = q \tag{15}$$

$$E\{\epsilon^2\} - E^2\{\epsilon\} = q(1-q)/N. \tag{16}$$

Thus, as N gets large, the fractional number of ground stations with CNR degradation between A and A' approaches q with probability one.

To apply this result to the resource-sharing environment, let A be the built-in margin, and let A' be the CNR degradation at the outage threshold. Then, for large N, the fraction of ground stations using the resource-sharing pool during the thunderstorm activity period is q with probability one. The pool is sized such that this fractional number of fades can be accommodated, and the usable satellite capacity is given by $$G = \frac{C(p_{max}/A)}{1 + q[C(p_{max}/A)/C(p_{max}/A') - 1]} \tag{17}$$

As before, G must now be maximized with respect to A. However, the number of simultaneous fades which are to be accommodated is no longer a second parameter to be optimized since, asymptotically, the fractional number of simultaneous fades is q with probability one. In performing the maximization, it must be recalled that q is a function of A and A'. The value A' is simply the CNR degradation of the outage objective and can be obtained directly from curves such as appear in FIG. 8.

The result of Eq. (17) is next readily generalized to accommodate three different rain regions. Let the common built-in margin be A. Let the CNR degradation for the three regions at the outage threshold be $A_1$, $A_2$, and $A_3$, respectively, and let $h_1$, $h_2$, and $h_3$ be the fractional number of ground stations in regions 1, 2, and 3, respectively. Then, the usable capacity is $$G = \frac{C(p_{max}/A)}{1 + \sum_{i=1}^{3} q_i h_i [C(p_{max}/A)/C(p_{max}/A_i) - 1]} \quad (18)$$

where $$q_i = \zeta[P_i(A) - P_i(A_i)], i = 1,2,3 \quad (19)$$

$P_i(A)$ = yearly averaged probability that the CNR degradation exceeds A in the $i^{th}$ region, $i = 1,2,3$ (20)

$P_i(A_i)$ = yearly averaged probability that the CNR degradation exceeds $A_i$ in the $i^{th}$ region, $i = 1,2,3$ (21)

Again, G must be maximized with respect to A.

To reduce the size of the reserved pool further, the result of Eq. (18) can be generalized to include different CNR degradation classes. The result of Eq. (18) assumes that the use of resource-sharing is a binary decision: if the CNR degradation is less than A resource sharing is not used, and if the CNR degradation is anywhere between A and $A_i$, the full number of additional time slots or portion of a time slot needed to provide protection down to a CNR degradation if $A_i$ is used. However, if the CNR degradation is between A and $\Delta \cdot A$, where $\Delta > 1$ and $\Delta \cdot A < A_i$ for all i, then a smaller allocation can be made to accommodate this fade. Thus, for this case, the usable capacity is:

$$G = \frac{C(p_{max}/A)}{D} \quad (22)$$

where $$D = \sum_{i=1}^{3} \{q_i' h_i [C(p_{max}/A)/C(p_{max}/(\Delta \cdot A)) - 1] + \quad (23)$$

$$q_i'' h_i [C(p_{max}/A)/C(p_{max}/A_i) - 1]\}$$

and $$q_i' = \zeta[P_i(A) - P_i(\Delta \cdot A)], i = 1,2,3 \quad (24)$$

$$q_i'' = \zeta[P_i(\Delta \cdot A) - P_i(A_i)], i = 1,2,3 \quad (25)$$

The result of Eq. (22) is trivially extended to include multiple fade classes. In the limit, as fades are accommodated with infinite granularity, the result is:

where $P_i(x)$ is the yearly averaged probability that the CNR degradation exceeds x in region $i$, $i = 1,2,3$.

The analysis heretofore provided will now be used to explore the potential capacity of a combined resource-sharing channel coding approach in accordance with the present invention for a specific arrangement of FIGS. 1 and 2. For such exemplary illustration, a satellite longitude of 100 degrees W, an operating frequency of 12 GHz, and uncooled (300 degrees K.) receiver front end are assumed. Suppose a clear-air CNR of 25 dB is available and an outage objective of 0.01 percent is desired. When the CNR degradation in dB exceeds the built-in margin 10 log A, a single block of time slots sufficiently large to provide for the desired outage objective is borrowed. Let the system BT product be 1 for both the normal and resource-sharing modes, and suppose that the built-in margin is 5 dB. Let the correlation factor $\zeta$ be 24.

From FIG. 8, it is seen that margins of 17 dB, 20 dB, and 5.7 dB are needed to achieve the outage objective in Regions 1, 2, and 3, respectively. From FIG. 7, it is determined that the resource-sharing threshold transmission rate is 3.9 b/s/Hz, corresponding to 10 log $p = \log P_{max} - 10 \log A = 25 - 5 = 20$ dB, and can be achieved using $32\phi$ – PSK modulation. At the outage objective, the achievable transmission rates are 1.65, 1.05, and 3.7 b/s/Hz, corresponding to CNR's of $25 - 17 = 8$ db, $25 - 20 = 5$ dB, and $25 - 5.7 = 19.3$ dB in Regions 1, 2, and 3, respectively. Each burst must be extended by the factor $3.9/1.65 - 1 = 1.36$, $3.9/1.05 - 1 = 2.71$, and $3.9/3.7 - 1 = 0.05$ in Regions 1, 2, and 3, respectively, when the quantity, 1, in the above relationships relates to the time slot normally used. The probability that the CNR degradation exceeds the built-in margin is $24 \times 0.0008 = 0.0192$ in Region 1, $24 \times 0.00183 = 0.04392$ in Region 2, and $24 \times 0.000125 = 0.003$ in Region 3. Since an outage objective of 0.01 percent is required at each ground station from Eq. (19) the probability that resource-sharing is needed is $0.0192 - 24 \times 0.0001 = 0.0168$, $0.04392 - 24 \times 0.0001 = 0.04152$, and $0.003 - 24 \times 0.0001 = 0.0006$ in Regions 1, 2, and 3, respectively.

Substituting the above data into Eq. (18), one obtains a usable capacity of 3.74 b/s/Hz for this satellite transponder. Repeating these steps for various values of the built-in margin A, one finds that a maximum usable capacity of 3.98 b/s/Hz results for a built-in margin of 2.5 dB.

Figure 9:
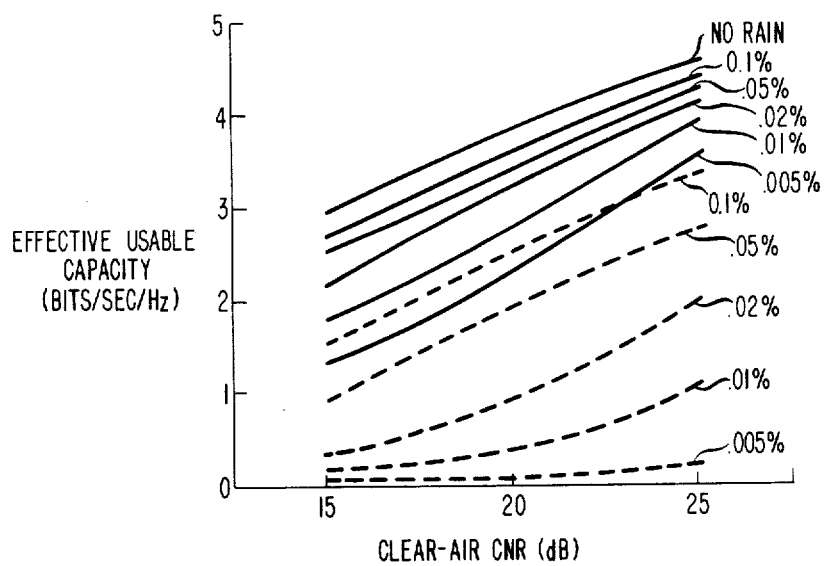
FIG. 9 illustrates curves for effective usable capacity at 12 GHz vs. clear air carrier-to-noise ratio for selected downlink outage objectives in the arrangement of FIGS. 1 and 2 for a predetermined satellite location, BT product, rain correlation factor and receiver temperature.

Following the procedure outlined hereinabove, the plots of FIG. 9 can be obtained. Plotted in FIG. 9, as a function of clear-air CNR and for select outages, are (1) the capacity in the absence of rain, (2) the effective usable capacity for the combined resource sharing-coding approach, and (3) the capacity if coding alone is employed. From these curves, it can be concluded that the resource-sharing capacity improvement generally increases as the clear-air CNR diminishes. For a clear-air CNR of 15 dB and 0.01 percent outage, the use of resource-sharing improves the usable capacity by a factor greater than 10. The size of the resource-sharing $$G = \frac{C(p_{max}/A)}{1 + \sum_{i=1}^{3} \zeta h_i \int_A^{A_i} \left[ -\frac{dP_i(x)}{dx} \right] [C(p_{max}/A)/C(p_{max}/x) - 1] dx} \quad (26)$$

reserved pool, which has, of course, been accounted for in arriving at the effective usable capacity, varies between 1.3 percent and 28 percent of the frame depending on the clear-air CNR and outage objective. In general, the size of the pool decreases as the CNR increases. Also, the required pool size decreases as more rain outage is tolerated. The optimum built-in fade margin varies between 1.5 dB and 6 dB. In general, the optimum built-in margin decreases as the clear-air CNR increases and as greater rain outage is tolerated.

Figure 7:
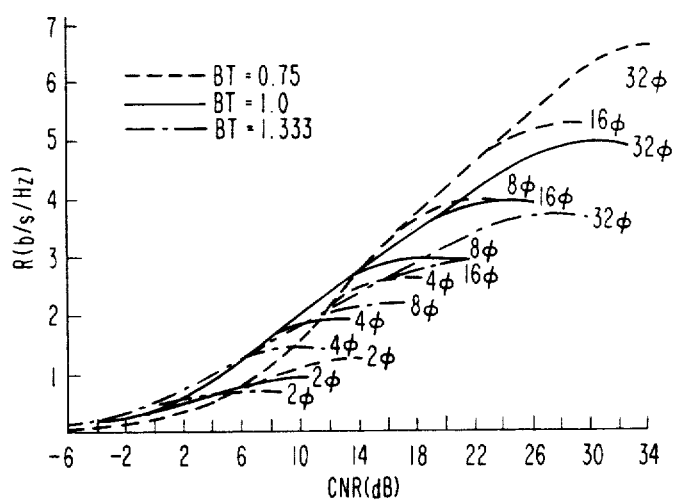
FIG. 7 illustrates curves of the permissible rate of information transfer vs. carrier-to-noise ratio for various M values of PSK signaling for the arrangement of FIGS. 1 and 2.

For the preceding discussion it must be understood that for a given CNR, a convolutional code can be found to achieve any desired BER provided that the rate of transmission is less than the random coding band which varies with the CNR as indicated in FIG. 7. Using the preceding outline, a different set of curves can also be found for each different channel configuration as, for example, by the use of different types of filters etc. Having determined a predetermined convolutional code, a predetermined level PSK code can be then used to achieve maximum data throughput in consideration of all other factors which may be deemed pertinent as described hereinbefore. This same process can be used to determine the convolutional code and the M level of the PSK code for use not only in the clear-air condition but for each fade range condition to maintain maximum data throughput for each condition.

What is claimed is:

1. A transmitter capable of transmitting each of one or more digital message burst input signals in at least one separate assigned time slot of a time division multiple access (TDMA) frame sequence which is destined for a separate one of a plurality of remote, spaced apart, receivers of a TDMA communication system, the transmitter comprising:

encoding means (12) capable of receiving each of the one or more digital message burst input signals to be transmitted, the encoding means comprising a plurality of redundancy encoders (33) which generate different redundancy codes and a control means (32) connected to the plurality of redundancy encoders for selecting one of said redundancy encoders and associated redundancy code to be used in encoding each of the one or more digital message burst input signals; and modulating means (14) comprising a signal constellation encoder (42) capable of selectively generating any one of a plurality of signal constellations, where each signal constellation comprises a plurality of points and is not a scalar replica of another signal constellation, and converting each of the encoded digital message burst input signals from the encoding means into a selected one of the plurality of signal constellations, and control means (44) for causing the signal constellation encoder to selectively use a predetermined one of the plurality of signal constellations for each of the redundancy encoded digital message burst input signals;

the encoding means control means and the modulating means control means being capable of selecting a first pair combination of a predetermined redundancy code and a predetermined signal constellation for encoding a digital message burst input signal for transmission in a single time slot of the frame sequence when the transmission between the transmitter and remote receiver destined to receive said transmitted message burst input signal is equal to or above a predetermined carrier-to-noise ratio (CNR), and selecting a second pair combination of a predetermined redundancy code and a predetermined signal constellation for encoding a digital message burst input signal for transmission in more than one time slot of the frame sequence when the transmission between the transmitter and a remote receiver destined to receive said transmitted message burst signal is below said predetermined CNR, the first pair combination being a fixed pair of a predetermined redundancy code and a predetermined signal constellation and the second pair combination comprising a selectively different pair of a predetermined redundancy code and a predetermined signal constellation than used for said first pair combination for achieving a high transmission capacity while maintaining low fade condition outage for each of the one or more message burst signal transmissions.

2. A transmitter according to claim 1 wherein the signal constellation encoder is a quadrature amplitude modulation (QAM) encoder and each of the signal constellations is derived from a different value of M phase shifts than used with each of the other signal constellations.

3. A transmitter according to claim 2 wherein the QAM encoder is capable of selectively generating any one of a plurality of different signal constellations for use with said second pair combination and said modulating means control means is capable of selectively causing the QAM encoder to use one of said plurality of different signal constellations each time a redundancy encoded message burst signal is being modulated for transmission to a remote receiver experiencing a fade condition, where each of said plurality of different signal constellations is associated with a predetermined separate depth of fade range.

4. A transmitter according to claim 1 wherein the transmitter further comprises scrambling means (13) for scrambling the output signal of the encoding means to insure independence of contiguous encoded symbols.

5. A transmitter according to claim 1, 2, 3 or 4 wherein the encoding means control means is capable of selectively enabling one of said plurality of redundancy encoders for use during each time slot of the frame sequence where a message burst signal is to be transmitted, the redundancy encoder being selectively enabled to achieve a predetermined bit error rate in the transmission of the message burst to the remote receiver and maintain the rate of bit transmission at a value less than a random coding band which varies with the carrier-to-noise ratio.

6. A receiver capable of receiving digital message burst signals transmitted by a remote transmitter in separate time slots of a time division multiple access (TDMA) frame sequence and destined for the receiver, where the transmitter uses (a) a first pair combination of a predetermined redundancy code of a plurality of different redundancy codes and a predetermined signal constellation of a plurality of different signal constellation for encoding each message burst signal for transmission in one time slot of the TDMA frame sequence when the carrier-to-noise ratio (CNR) is equal to or above a predetermined CNR in transmissions between the transmitter and receiver corresponding to a predetermined clear air condition, where each different signal constellation includes a set of points which is different and not a scalar replica of the set of points for each of the other signal constellations, and (b) a second pair combination of a predetermined redundancy code and a predetermined signal constellation for encoding each message burst signal for transmission in more than one time slot of the TDMA frame sequence when the transmission between the transmitter and receiver is below said predetermined CNR, the first pair combination being a fixed pair of a predetermined redundancy code and a predetermined signal constellation and the second pair combination comprising a selectively different pair of a predetermined redundancy code and a predetermined signal constellation than used for said first pair combination for achieving a high transmission capacity while maintaining low fade condition outage;

the receiver comprising:
  filtering means (21) for generating an output signal comprising only signals received within a predetermined frequency band;
  demodulating means including a signal constellation demodulating means capable of translating a signal constellation comprising a predetermined set of points, received in each of the message burst signals destined for the receiver into an output signal indicative of a vector value of the output signal from the filtering means; and
  sequence estimating means including a decoding means capable of decoding the output signal of the demodulating means wherein each originally encoded message burst signal was encoded using a predetermined one of a plurality of redundancy codes to derive each remotely transmitted message burst signal in its original form.

7. In a time division multiple access (TDMA) communication system comprising a plurality of remote, spaced apart, stations which communicate with one another using digital message burst signals transmitted in assigned time slots of a frame sequence, a method of providing maximum data transmission and rain margin in transmissions between two stations of the system which are experiencing either one of a fade or non-fade condition, the method comprising the steps of:

at a transmitting station
  (a) encoding a message burst signal using a first pair combination of a predetermined redundancy code of a plurality of redundancy codes and a predetermined signal constellation of a plurality of signal constellations and transmitting said encoded message burst signal in a single time slot of the frame sequence when the transmission between the transmitter and the remote receiver destined to receive the message burst signal is equal to or greater than a predetermined carrier-to-noise ratio (CNR), where each signal constellation of the plurality of signal constellations comprises a plurality of points and is not a scalar replica of another signal constellation; and
  (b) encoding a message burst signal using a second pair combination of a predetermined redundancy code of a plurality of redundancy codes and a predetermined signal constellation of a plurality of signal constellations and transmitting said encoded message burst signal once in more than one time slot of the TDMA frame sequence when the transmission between the transmitter and the remote receiver destined to receive the message burst signal is below the predetermined CNR, where the first pair combination and the second pair combination are a different pair of the plurality of redundancy codes and the plurality of signal constellations.

* * * * *